United States Patent [19]

Anderson et al.

[11] 4,219,592

[45] Aug. 26, 1980

[54] TWO-WAY SURFACING PROCESS BY FUSION WELDING

[75] Inventors: David W. Anderson, Palm Beach Gardens, Fla.; William H. King, Higganum; David R. Malley, Manchester, both of Conn.

[73] Assignee: United Technologies Corporation, Hartford, Conn.

[21] Appl. No.: 814,590

[22] Filed: Jul. 11, 1977

Related U.S. Application Data

[63] Continuation-in-part of Ser. No. 731,410, Oct. 12, 1976, abandoned.

[51] Int. Cl.² .......................... B05D 1/36; B05D 7/00
[52] U.S. Cl. ...................................... 427/405; 75/170; 75/171; 219/76.15; 427/37; 427/419.1; 427/376.6; 428/678; 428/679; 428/680
[58] Field of Search .......... 427/376 E, 376 G, 376 H, 427/405, 419 R, 37; 428/679, 678, 680; 75/171, 170; 148/32, 32.5; 219/76.15

[56] References Cited

U.S. PATENT DOCUMENTS

| | | | |
|---|---|---|---|
| 3,223,818 | 12/1965 | Chyle | 428/679 |
| 3,248,213 | 4/1966 | Smith et al. | 75/171 |
| 3,338,733 | 8/1967 | Rowady | 427/405 |
| 3,700,427 | 10/1972 | Hoppin et al. | 75/171 |
| 3,723,107 | 3/1973 | Richards et al. | 75/171 |
| 3,741,824 | 6/1973 | Duvall et al. | 428/680 |
| 3,972,713 | 8/1976 | Muzyka et al. | 75/171 |
| 4,005,989 | 2/1977 | Preston | 427/405 |
| 4,054,723 | 8/1975 | Higginbotham et al. | 428/680 |

Primary Examiner—Ronald H. Smith
Assistant Examiner—Sadie L. Childs
Attorney, Agent, or Firm—Charles E. Sohl

[57] ABSTRACT

A fushion welded surfacing process for use with crack prone substrates is described. The process involves the application of an intermediate layer of crack resistant alloy by fusion welding followed by the application of the desired final surfacing alloy by fusion welding. The intermediate layer is an age hardenable nickel superalloy to which intentional additions of manganese have been made. The final surfacing alloy may be of the hardfacing type or may be of a type which imparts corrosion and oxidation resistance to the underlying article.

12 Claims, 3 Drawing Figures

100X

100X

TWO-WAY SURFACING PROCESS BY FUSION WELDING

BACKGROUND OF THE INVENTION

CROSS REFERENCE TO RELATED APPLICATIONS

This application is a continuation-in-part application of U.S. Ser. No. 731,410, filed Oct. 12, 1976 now abandoned.

FIELD OF THE INVENTION

This invention relates to fusion welding surfacing techniques in which a fusion welding process is used to apply a surface layer having desired properties to an underlying article without causing cracking.

DESCRIPTION OF THE PRIOR ART

In many engineering application, part life is limited by the surface properties of the part in a localized area. For example, in many bearing applications, the utility of the bearing is controlled by the wear resistance of the bearing surfaces but such wear resistance is required in only limited areas. Another example is that of gas turbine blades in which blade life may be controlled by the oxidation/corrosion and wear resistance of the blade tip. In such applications, the use of localized surfacing techniques has been attempted. One such surfacing technique involves the use of fusion welding to apply a harder and/or more corrosion resistant material to a localized area. An example of this is the hardfacing process described in Vol. 6, of the *Metals Handbook*, pp. 152–166. Attempts have been made to employ a similar process to fabricate corrosion and wear resistant blade tips on gas turbine blades. One problem limits the application of fusion welding as a surfacing technique. This problem is that of thermally induced cracking either in the article being welded or in the material being applied by the fusion welding process. The cracking problem is particularly prevalent in the high strength, nickel base superalloys which are commonly used in gas turbine engines.

To counteract this weld cracking problem, it has been proposed to use a two-layer welding approach. In this approach, a first layer of a ductile, low strength alloy less prone to weld cracking is applied to the underlying article. Next, a second layer of a material having the desired properties of hardness and/or oxidation resistance is applied. The intermediate layer can yield and deform to accommodate thermal stresses and reduce cracking. Since prior art crack-free alloys, used as an intermediate layer, are low strength alloys, the mechanical properties of the intermediate layer are a limiting factor which determines the performance of the final article. An example of this prior art two-layer welding process employs an intermediate layer of AMS 5837 and an outer layer of AMS 5801 to protect gas turbine blade tips. Such a process is marginal for current high performance gas turbine. The low mechanical properties of AMS 5837 can lead to thermal fatigue cracking in service. Further, the AMS 5801 alloy lacks sufficient resistance to oxidation, corrosion and erosion under blade tip conditions encountered during service. Intermediate alloys with higher strengths can cause substrate cracking.

SUMMARY OF THE INVENTION

The present invention relates to a novel two-layer fusion welding technique in which the intermediate layer is a high strength, weld crack resistant nickel alloy. This intermediate layer alloy is resistant to weld cracking by virtue of the presence of a small amount of manganese. The use of this high strength weld crack resistant alloy permits the use of high performance alloys for the final weld layer. Suggested welding techniques which involve low heat inputs to minimize distortion and microstructural damage are described. The resultant weld surfaced article also forms a part of the invention.

The foregoing and other objects, features and advantages of the present invention will become more apparent in the light of the following detailed description of preferred embodiments thereof as illustrated in the accompanying drawing.

DESCRIPTION OF PREFERRED EMBODIMENTS

Figure 1:
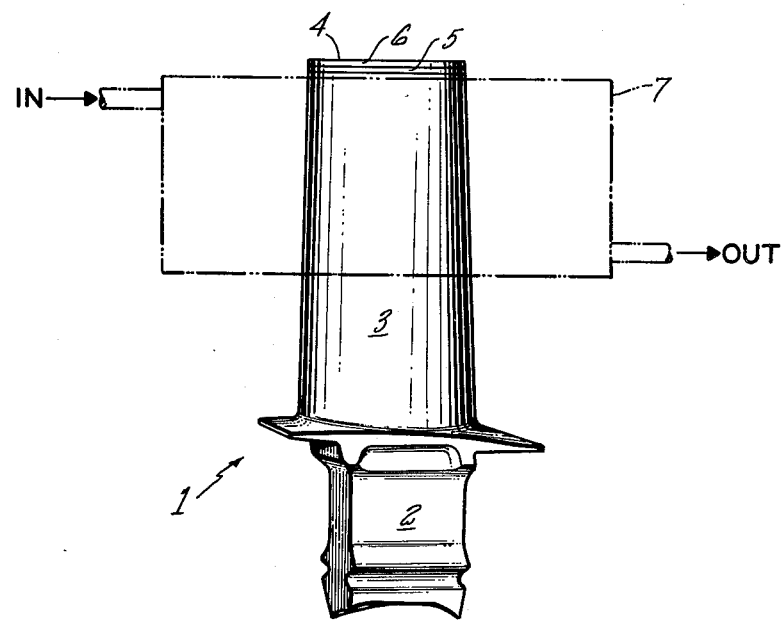
FIG. 1 shows a gas turbine blade having a two-layer welded tip.

This application relates to a process for producing a fusion welded surface on crack prone substrates, and the resultant article.

Certain alloys display a marked tendency to crack during fusion welding as a result of the thermal stresses which arise during the welding process and a tendency to crack during post weld heat treatment. Among the most crack prone alloys are those which are generically termed nickel superalloys. These alloys are strengthened by formation of the gamma prime phase and usually also contain refractory metals for further strengthening. Examples of specific superalloy compositions will be given below. While the process of the invention has particular utility with regard to the weld surfacing of superalloys, it has equal utility with regard to the weld surfacing of other crack prone materials such as high strength steels and the like.

The invention will be described with regard to the weld surfacing applications in gas turbine engines. These applications include the production of wear resistant blade tips, the application of hardfacing materials to blade shrouds and the general field of repair of blade and vane assemblies. Such repairs have been limited in the past by the nature of weld composition materials available and the tendency of superalloys to crack during welding and during post weld heat treatment. Prior art compositions have not had the required combination of high strength and crack resistance which is achieved by the intermediate layer alloy composition used in the present invention.

The parent application of this application, U.S. Ser. No. 731,410, describes a family of age hardenable weld filler compositions which possess superior strength and which are remarkably resistant to weld cracking as a consequence of the inclusion of a small amount of manganese. The alloys described in this application fall into two categories. The first category consists of alloys which contain at least 3% and preferably at least 4% of (Al+Ti) and which are strengthened predominantly by the gamma prime phase. From 0.5% to 3% manganese is added to these alloys to reduce weld cracking. The second class of alloy described in the pending parent application are those which contain at least 5% (Al+Ti+Cb+Ta) and which are strengthened predominantly by precipitation of the gamma double prime phase. From 0.5% to 3% manganese is also added to these alloys to reduce weld cracking. Composition limits for alloys of the types described above are listed in Table 1. Alloy A is of the type which is strengthened by the gamma prime phase while alloy B is of the type which is strengthened by the gamma double prime phase. These crack resistant alloys are used as an interlayer between the article being surfaced and an outer surface layer having the desired properties of hardness, oxidation resistance, corrosion resistance and the like. Examples of alloys which may be used as an outer layer in applications where oxidation, corrosion and wear are problems are shown in Table 1 in which alloy C is an alloy described and claimed in U.S. patent application Ser. No. 793,334 and alloy D is an alloy disclosed and claimed in U.S. patent application Ser. No. 638,882. Alloy C has been optimized with regard to hardness and wear resistance under high temperature oxidizing conditions while alloy D has been optimized with regard to oxidation and hot corrosion resistance. Another class of alloys are those referred to as hardfacing alloys. Alloy E is a typical prior art hardfacing alloy.

Also shown in Table 1 as alloy F, are the broad chemistry ranges which encompass most commercial nickel superalloys used in gas turbine engines.

In Table 1, alloys C, D, E and F are meant to be exemplary rather than limiting.

The process of the present invention involves deposition, preferably by fusion welding, of the thin layer of a crack resistant alloy such as alloys A and B of Table 1 followed by the deposition of a thin layer of a hard and/or oxidation-corrosion resistant alloy such as alloys C, D and E. Referring to Table 1, attempts to directly deposit alloys C, D and E on substrate alloy F by fusion welding were unsuccessful because of cracking. When the process of the present invention was employed, so that an interlayer of alloys A or B was deposited before the layer of alloys C, D or E were deposited, completely successful results were obtained and no cracking was observed.

TABLE I

| Element | A | B | C | D | E | F |
|---|---|---|---|---|---|---|
| Cr | 14–22 | 14–22 | 21–27 | 18–30 | 26–30 | 5–25 |
| Co | 5–15 | 0–5 | 0–20 | Bal | Bal | 0–25 |
| Fe | 0–5 | 7–18 | — | — | — | — |
| Mo | 0–8 | 0–8 | — | — | — | 0–10 |
| W | — | — | 5–10 | — | 18–21 | 0–15 |
| Al | .7–3 | .5–1.5 | 4.5–7 | 3.5–8 | — | .5–7 |
| Ti | .5–4 | 0–2 | 0–3 | 0–.5 | — | .5–5 |
| Ta + Cb | 0–6 | — | — | 1–5 | — | — |
| Mn | .5–3 | .5–3 | — | — | — | — |
| C | 0–.1 | 0–.1 | .1–.3 | .05–.6 | .7–1 | .01–.25 |
| B | 0–.05 | 0–.05 | — | 0–.5 | .005–.1 | 0–.2 |
| Zr | 0–.1 | 0–.08 | — | — | — | 0–.5 |
| Ni | Bal | Bal | Bal | — | 4–6 | Bal |
| Ta | — | 0–8 | 2.5–7 | — | — | 0–5 |
| Cb | — | 2–5 | — | — | — | 0–5 |
| W + Mo | — | — | — | 5–15 | — | — |
| Y | — | — | .02–.15 | .02–.1 | — | — |
| Hf | — | — | — | .5–2. | — | 0–3 |
| V | — | — | — | — | .75–1.25 | — |
| Al + Ti | >3 | — | — | — | — | 2–10 |
| Ni + Fe | — | — | — | 0–30 | — | — |
| Al + Ti + Cb + Ta | — | >5 | — | — | — | — |

The present invention process may be used as a repair process, for example to repair surface defects in castings. In this application, the composition of the surface layer could be the same as or similar to the composition of the substrate.

Even when welding with a crack resistant filler material, such as that used in the intermediate layer, cracking can be induced by improper welding techniques. Accordingly, techniques which employ a minimum amount of heating are employed and these techniques require low deposition rates. The use of small diameter weld wire, for example 0.030 inch diameter, is preferred.

The process of the invention will be illustrated with respect to the production of wear resistant tip on a gas turbine blade. FIG. 1 shows a typical turbine blade 1 which is comprised of a root portion 2 and an airfoil portion 3 having a tip surface 4. In operation in a gas turbine engine, the tip surface 4 will rub against a seal surface in the engine. Operating conditions in the engine are severe and include high temperatures and corrosive gas mixture combined with the rubbing action noted earlier. The alloy from which the bulk of the blade is fabricated is optimized with regard to mechanical strnegth at elevated temperatures and it is desirable to employ a tip of a different composition which can be optimized with regard to wear, hardness and oxidation resistance. The alloy of the blade body might typically be an alloy such as alloy F in Table 1 and it might be desired to use a tip alloy such as alloys C and D in Table 1. As previously noted, however, fusion welding of alloys as C and D in Table 1 to alloy F in Table 1 is not successful because of cracking. By using the process of the invention such a blade tip may be applied. And the resultant article is useful and durable in its service environment.

As shown in FIG. 1, a layer 5 of a crack resistant alloy is first applied to the blade tip followed by a layer 6 of the desired tip alloy. As previously noted, it is desirable that the heat input to the article being surfaced by minimized so as to avoid cracking and to avoid damage to the microstructure of the article being surfaced. In order to achieve this goal of minimum heat input, cooling means may be employed and in the case of blade tip applications, a water-cooled copper fixture 7 may be employed as shown in FIG. 1.

The intermediate layer is produced by fusion welding using a tungsten electrode, and providing electrical conditions which will cause an arc between the tungsten electrode and the article being surfaced. The intermediate filler wire is then melted in the arc and allowed to solidify on the article being surfaced. (This process is commonly referred to as GTA welding. GMA welding in which the filler metal is employed directly as the electrode might also be employed.) In the particular case of blade tips, the fusion welding process is employed to produce a layer of the intermediate alloy having a thickness on the order of 0.030–0.040 inch. Following the deposition of the intermediate layer, grinding or similar means may be used to dress the deposited alloy back to a uniform layer having a thickness of about 0.020 inch. This dressing process removes surface oxides which may result from the welding process and provides a clean, smooth surface and a uniform thickness layer for the deposition of the outer layer by a similar fusion welding process. After the deposition of the outer layer to the desired thickness, usually thicker than the intermediate layer, perhaps 0.020–0.080, the outer layer may again be dressed back to provide a uniform thickness and a smooth surface. After this deposition process, appropriate stress relief heat treatments may be employed although these are not a part of the invention.

Figure 2:
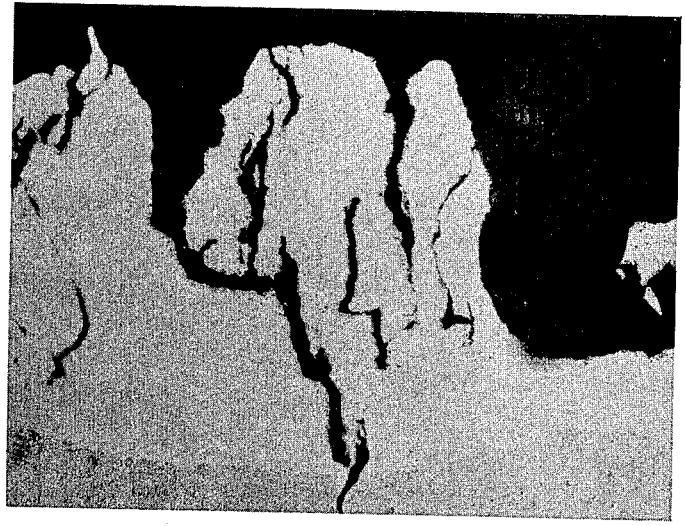
FIG. 2 shows a photomicrograph of prior art two-layer welded tip comprised of AMS 5837 and AMS 5801.
Figure 3:
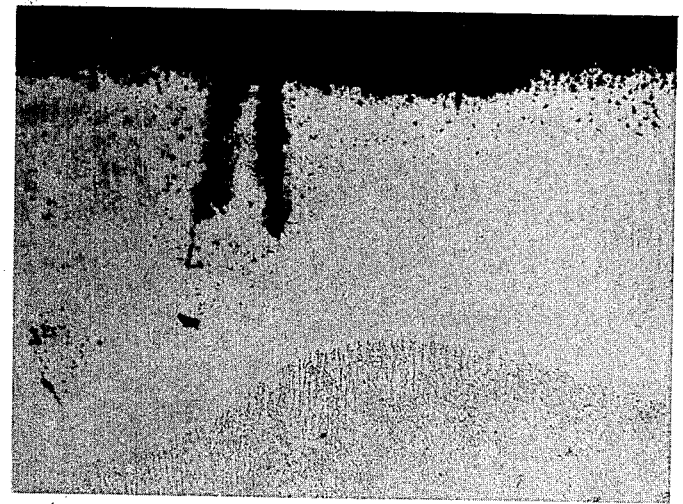
FIG. 3 shows a photomicrograph of a two-layer welded tip according to the present invention.

The benefits achievable through the use of the present invention are illustrated in FIGS. 2 and 3 which are photomicrographs showing blade tip crack penetration after 175 hours of accelerated engine testing. FIG. 2 shows the crack penetration of blade tips produced by the prior art process involving a layer of AMS 5837 and a layer of AMS 5801. FIG. 3 is a cross section of a blade tip produced according to the invention. The composition of the intermediate layer (C4) and the outer layer (MERL 72) in FIG. 3 are given in Table 2 along with the substrate composition and the composition of the prior art alloys, AMS 5837 and AMS 5801. The views shown in FIGS. 2 and 3 were selected as being typical after observation of numerous cracks. Both blades were run in the same engine under identical conditions and the difference in crack penetration between the two blades is significant. The prior art blade tip (FIG. 2) had cracks which extended through the tip into the substrate while the blade tip produced according to the present invention (FIG. 3) had cracks which extended only about halfway through the tip. In addition, the prior art blade tip showed evidence of general mechanical damage and deterioration from erosion. The damage to the invention blade tip is characteristic of oxidation/corrosion damage without general mechanical deterioration. The difference in blade tip performance is due largely to the superior outer layer which can only be applied without cracking using the invention process and to the higher strength of the intermediate layer used in the invention process. Although the previous description has used a blade tip fabrication process as an example, the two-layer process described may be employed in other applications where a surface having properties different than those of the substrate must be applied.

TABLE 2

|    | AMS 5837* | AMS 5801* | C 4* | MERL 72** |
|----|-----------|-----------|------|-----------|
| C  | .05       | .1        | —    | .34       |

TABLE 2-continued

|    | AMS 5837* | AMS 5801* | C 4* | MERL 72** |
|----|-----------|-----------|------|-----------|
| Cr | 22        | 22        | 19   | 20        |
| Ni | Bal       | 22        | —    | 14.6      |
| Mo | 9         | —         | 3.5  | —         |
| Cb | 4         | —         | 4.8  | —         |
| Ti | .2        | —         | —    | .22       |
| Al | .2        | —         | 1    | 4.15      |
| Fe | .3        | —         | 12.5 | —         |
| Co | —         | Bal       | —    | Bal       |
| W  | —         | 14.5      | —    | 9.1       |
| La | —         | .075      | —    | —         |
| Ta | —         | —         | 7.2  | 2.9       |
| Y  | —         | —         | —    | .04       |
| Mn | —         | —         | .5   | —         |

*Nominal
**Actual

Although this invention has been shown and described with respect to preferred embodiments thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. A fusion welding method for applying protective surface layers to crack prone superalloy substrates including the steps of:
  a. using a fusion welding process to apply an intermediate layer of a crack resistant alloy consisting essentially of 14–22% Cr, 5–15% Co, 0–8% Mo, 0–5% Fe, 0.7–3% Al, 0.5–4% Ti, 0–6% (Ta+Cb), 0.5–3% Mn, 0–0.1% C, 0–0.05% B, 0–0.1% Zr, (Al+Ti) in excess of 3%, balance essentially Ni;
  b. using a fusion welding process to apply the desired protective surface layer on the intermediate layer; whereby the crack resistant intermediate layer essentially eliminates weld cracking in both the substrate and the surface layer.

2. A method as in claim 1 wherein the composition of the protective surface layer is 21–27% Cr, 0–20% Co, 4.7–7% Al, 0–3% Ti, 0.1–0.3% C, 2.5–7% Ta, 0.02–0.15% Y, balance essentially Ni.

3. A method as in claim 1 wherein the composition of the protective surface layer is 18–30% Cr, 3.5–8% Al, 0–0.5% Ti, 1–5% (Ta+Cb), 0.05–0.6% C, 0–0.5% B, 5–15% (W+Mo), 0.02–0.1% Y, 0.5–2% Hf, balance essentially Co.

4. A method as in claim 1 wherein the composition of the protective surface layer is 26–30% Cr, 18–21% W, 0.7–1% C, 0.005–0.1% B, 4–6% Ni, 0.75–1.25% V, balance essentially Co.

5. A method as in claim 1 wherein the composition of the substrate is 5–25% Cr, 0–25% Co, 0–10% Mo, 0–15% W, 0.5–7% Al, 0.5–5% Ti, 0.01–0.25% C, 0–0.2% B, 0–0.5% Zr, 0–5% Ta, 0–5% Cb, 0–3% Hf, 2–10% (Al+Ti), balance essentially Ni.

6. A method as in claim 1 wherein the composition of the protective surface layer is 5–25% Cr, 0–25% Co, 0–10% Mo, 0–15% W, 0.5–7% Al, 0.5–5% Ti, 0.01–0.25% C, 0–0.2% B, 0–0.5% Zr, 0–5% Ta, 0–5% Cb, 0–3% Hf, 2–10% (Al+Ti), balance essentially Ni.

7. A fusion welding method for applying protective surface layers to crack prone superalloy substrates including the steps of:
  a. using a fusion welding process to apply an intermediate layer of a crack resistant alloy consisting essentially of 14–22% Cr, 0–5% Co, 7–18% Fe, 0–8% Mo, 0.5–1.5% Al, 0–2% Ti, 0–8% Ta, 2–5% Cb, 0.5–3% Mn, up to 0.1% C, up to 0.05% B, up to 0.08% Zr, with the sum of (Al+Ti+Cb+Ta) exceeding 5%, balance essentially Ni;

b. using a fusion welding process to apply the desired protective surface layer on the intermediate layer;

whereby the crack resistant intermediate layer essentially eliminates weld cracking in both the substrate and the surface layer.

8. A method as in claim 7 wherein the composition of the protective surface layer is 21–27% Cr, 0–20% Co, 4.7–7% Al, 0–3% Ti, 0.1–0.3% C, 2.5–7% Ta, 0.02–0.15% Y, balance essentially Ni.

9. A method as in claim 7 wherein the composition of the protective surface layer is 18–30% Cr, 3.5–8% Al, 0–0.5% Ti, 1–5% (Ta+Cb), 0.05–0.6% C, 0–0.5% B, 5–15% (W+Mo), 0.02–0.1% Y, 0.5–2% Hf, balance essentially Co.

10. A method as in claim 7 wherein the composition of the protective surface layer is 26–30% Cr, 18–21% W, 0.7–1% C, 0.005–0.1% B, 4–6% Ni, 0.75–1.25% V, balance essentially Co.

11. A method as in claim 7 wherein the composition of the substrate is 5–25% Cr, 0–25% Co, 0–10% Mo, 0–15% W, 0.5–7% Al, 0.5–5% Ti, 0.01–0.25% C, 0–0.2% B, 0–0.5% Zr, 0–5% Ta, 0–5% Cb, 0–3% Hf, 2–10% (Al+Ti), balance essentially Ni.

12. A method as in claim 7 wherein the composition of the protective surface layer is 5–25% Cr, 0–25% Co, 0–10% Mo, 0–15% W, 0.5–7% Al, 0.5–5% Ti, 0.01–0.25% C, 0–0.2% B, 0–0.5% Zr, 0–5% Ta, 0–5% Cb, 0–3% Hf, 2–10% (Al+Ti), balance essentially Ni.

* * * * *